United States Patent
Hu et al.

(10) Patent No.: US 11,733,088 B2
(45) Date of Patent: Aug. 22, 2023

(54) SPATIAL AVERAGING METHOD FOR COHERENT DISTRIBUTED ACOUSTIC SENSING

(71) Applicant: NEC Laboratories America, Inc., Princeton, NJ (US)

(72) Inventors: Junqiang Hu, Davis, CA (US); Yue-Kai Huang, Princeton, NJ (US); Ezra Ip, West Windsor, NJ (US)

(73) Assignee: NEC Corporation

( * ) Notice: Subject to any disclaimer, the term of this patent is extended or adjusted under 35 U.S.C. 154(b) by 0 days.

(21) Appl. No.: 17/548,581

(22) Filed: Dec. 12, 2021

(65) Prior Publication Data

US 2022/0187121 A1 Jun. 16, 2022

Related U.S. Application Data

(60) Provisional application No. 63/124,948, filed on Dec. 14, 2020.

(51) Int. Cl.
*G01H 9/00* (2006.01)
*G01D 5/353* (2006.01)

(52) U.S. Cl.
CPC ......... *G01H 9/004* (2013.01); *G01D 5/35358* (2013.01)

(58) Field of Classification Search
None
See application file for complete search history.

(56) References Cited

U.S. PATENT DOCUMENTS

| | | | |
|---|---|---|---|
| 2019/0003879 A1* | 1/2019 | Bao | G02B 6/02 |
| 2019/0186958 A1* | 6/2019 | Godfrey | G01H 9/004 |
| 2019/0310304 A1* | 10/2019 | Yogeeswaran | G02B 6/483 |
| 2020/0249076 A1* | 8/2020 | Ip | G01H 9/004 |
| 2021/0172729 A1* | 6/2021 | Huang | G01L 1/242 |

* cited by examiner

*Primary Examiner* — Brandi N Hopkins
*Assistant Examiner* — Nigel H Plumb
(74) *Attorney, Agent, or Firm* — Joseph Kolodka

(57) ABSTRACT

A spatial averaging method for a coherent distributed acoustic sensing (DAS) system that employs differential beating and polarization combining of signals for two locations along a length of optical sensing fiber to determine phase change in-between every location along the length of the optical sensing fiber and a moving average using polarization combining output to reduce any Rayleigh fading before phase determination.

9 Claims, 14 Drawing Sheets

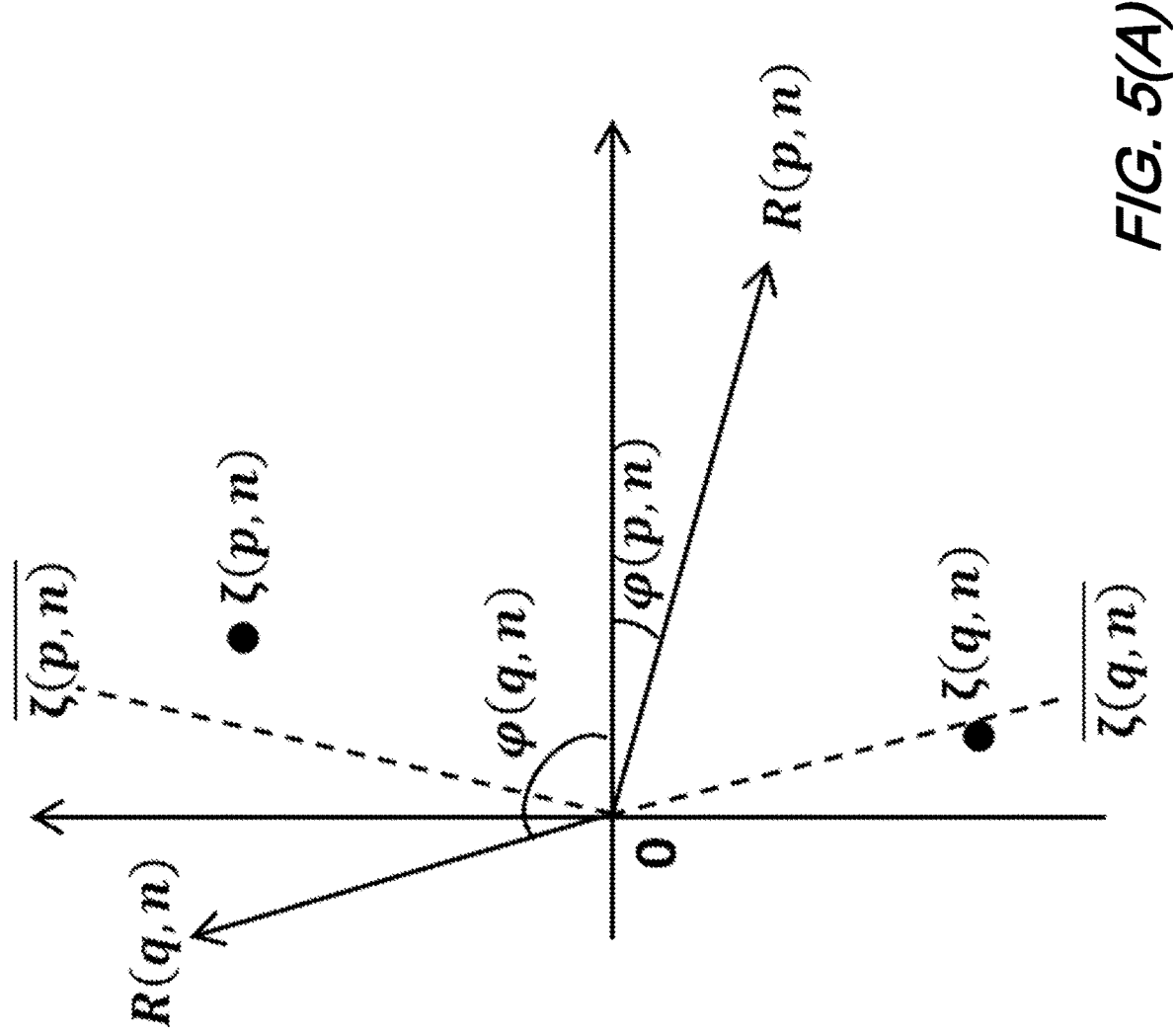

SPATIAL AVERAGING METHOD FOR COHERENT DISTRIBUTED ACOUSTIC SENSING

CROSS REFERENCE TO RELATED APPLICATIONS

This application claims the benefit of U.S. Provisional Patent Application Ser. No. 63/124,948 filed 14 Dec. 2020 the entire contents of which is incorporated by reference as if set forth at length herein.

TECHNICAL FIELD

This disclosure relates generally to coherent distributed acoustic sensing (DAS) systems, methods and structures using Rayleigh backscattering, which exhibit random and independent Rayleigh fading and low signal levels—or even no signal—at some fiber locations at any given time.

BACKGROUND

As will be understood by those skilled in the art, DAS systems exploit a Rayleigh scattering effect in optical fiber to detect changes in the fiber strain. The obtained dynamic strain signal is used to determine the vibration and acoustic signal along the entire length of the fiber optic cable under interrogation and the fiber location of such vibration. Coherent DAS extracts the phase from the complex signal to detect the strain. However, phase calculation is sensitive to signal strength under the same noise level. In DAS system relying on the detection of Rayleigh scattered signal, there is a possibility that at certain locations the signal strength will fade and be inundated by noise. This causes instability in the phase measurement.

SUMMARY

An advance in the art is made according to aspects of the present disclosure that advantageously employs a moving average using polarization combining output—to reduce any Rayleigh fading before phase determination—which advantageously improves output signal quality. To ensure proper alignment, the present disclosure describes a method that aligns multiple fiber locations involved in the averaging.

In sharp contrast to the prior art, systems, methods, and structures according to aspects of the present disclosure employ a novel moving average method among locations along an optical fiber, using a user configured number of taps. As we shall show and describe, there are two operations that advantageously strengthen the signal(s) and reduce the possibility of fading.

The first operation involves location grouping and group internal phase alignment wherein 1) locations along the fiber are divided into non-overlapping fixed size groups, with the number of locations in each group equal to the spatial averaging taps; 2) within each group, the location having the maximum averaged power ("elected location") is identified—for each DAS frame cycle, the averaged power is updated along with the elected location; 3) each location within the group has a phase rotation value, which is used to rotate the complex signal of the corresponding location to align with other locations within the group. This rotation value is updated in every DAS frame cycle; and 4) the averaged direction of the rotated complex signal in the elected location ("reference direction") is identified. For each location our method calculates the averaged difference with this reference direction and updates its rotation.

The second operation according to aspects of the present disclosure is inter-group phase alignment and combining and involves: First, calculate the averaged phase difference between the rotated complex value of the elected locations in each adjacent groups, as inter-group phase offset; Second for averaging that spans the groups, rotate the locations in one group to compensate the inter-group offset and then combine; Third, our method uses two steps of rotation to achieve the alignment: intra-group rotation, and then inter-group rotation, to align the phase of all the participating locations of an average wherein 1) Intra-group alignment uses the location of maximum power as reference and rotates the other locations to align their phase. This is achieved by comparing the phase difference between each other location and the elected location and rotating the other locations by the phase difference. This enables the tracking of phase change caused by both polarization switching and fiber stress, covering the full band of the sampled signal; and Inter-group alignment involves rotating one of the groups using the phase difference between the two groups. This method saves the phase difference between every two groups, rather than each location participating in an averaging, to reduce the calculation complexity and required buffer size from $O(N)$ to $O(1)$ where N is the number of averaging taps. Our method uses the rotated value of the elected location, to calculate the phase difference, for both intra- and inter-group alignments. This enables phase continuity when changing the elected location and tracks the direction of the maximum power location, so any information in the signal (including ultra-low frequency) will be preserved

BRIEF DESCRIPTION OF THE DRAWING

A more complete understanding of the present disclosure may be realized by reference to the accompanying drawing in which:

FIG. 5(A) and FIG. 5(B) are a pair of plots illustrating group internal alignment according to aspects of the present disclosure.

Figure 1A:
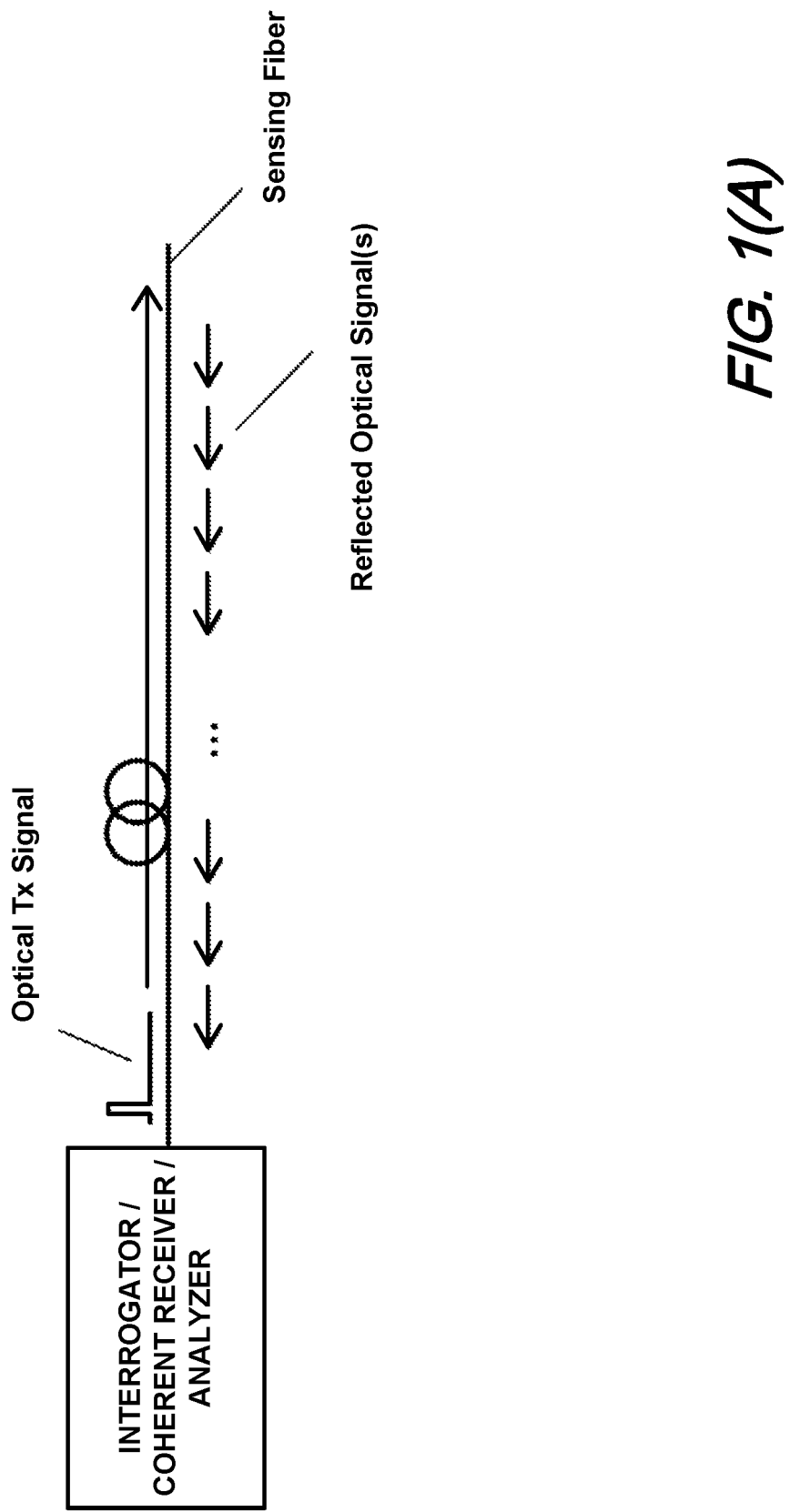
FIG. 1(A) is a schematic diagram of an illustrative prior art DAS arrangement.

The illustrative embodiments are described more fully by the Figures and detailed description. Embodiments according to this disclosure may, however, be embodied in various forms and are not limited to specific or illustrative embodiments described in the drawing and detailed description.

DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGs comprising the drawing are not drawn to scale.

By way of some additional background—we again note that in recent years, distributed fiber optic sensing (DFOS) systems including distributed vibration sensing (DVS) and distributed acoustic sensing (DAS) have found widespread acceptance in numerous applications including—but not limited to—infrastructure monitoring, intrusion detection, and earthquake detection. For DAS and DVS, backward Rayleigh scattering effects are used to detect changes in the fiber strain, while the fiber itself acts as the transmission medium for conveying the optical sensing signal back to an interrogator for subsequent analysis.

FIG. 1(A) shows a simplified schematic diagram of a prior art DFOS/DVS/DAS system employing an interrogator/coherent receiver/detection/analysis system. Operationally, such a system generates/applies an optical Tx signal into an optical sensing fiber which results in reflected/scattered optical signals being directed back to the receiver/analysis system which receives/detects/analyzes the reflected/scattered and subsequently received signals. The signals are analyzed, and an output is generated which is indicative of the environmental conditions encountered along the length of the fiber.

Figure 1B:
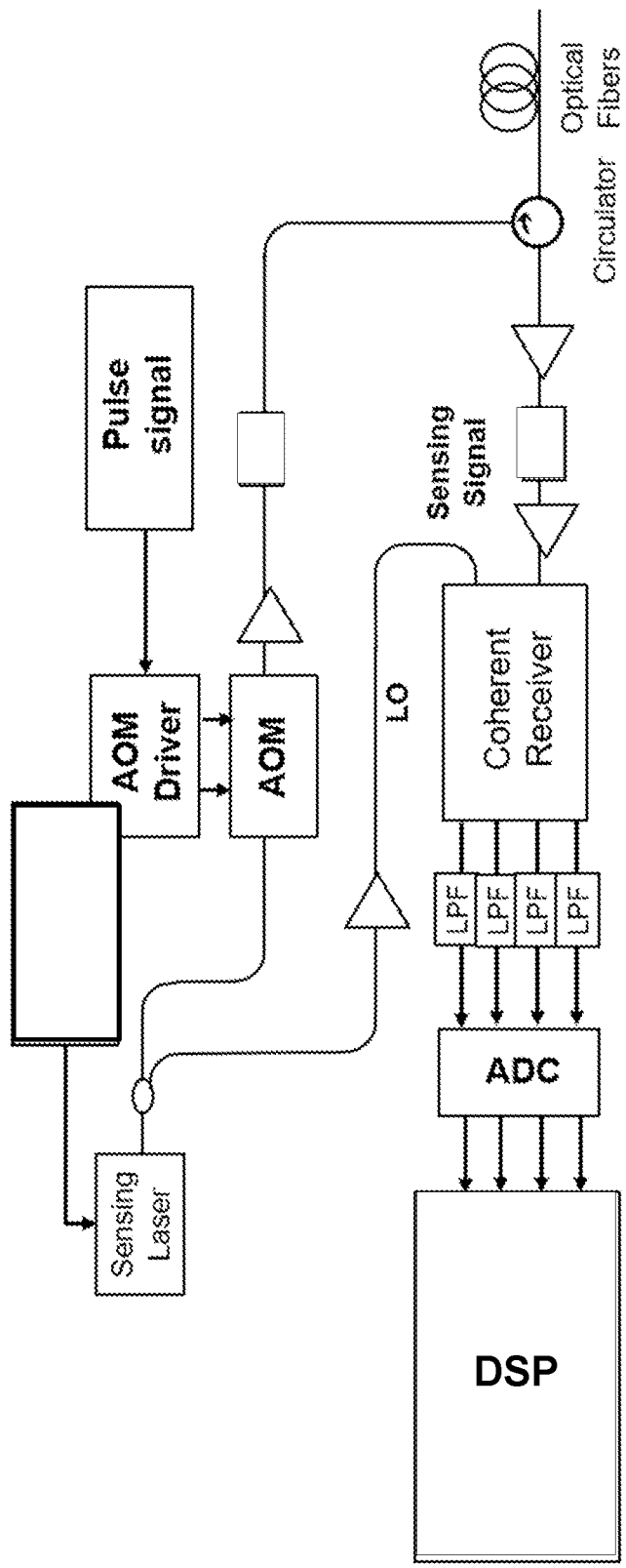
FIG. 1(B) is a schematic diagram of an illustrative coherent DAS arrangement according to aspects of the present disclosure.

FIG. 1(B) is a schematic block diagram of an illustrative coherent DAS system according to aspects of the present disclosure. Since a coherent DAS system uses Rayleigh scattering to detect acoustic signal along a sensing fiber, it generally employs an interrogator that includes a transmitter (Tx) that generates an optical signal (pulse or code) periodically. The optical signal is directed into a distributed sensing fiber. Each location along the fiber reflects a small portion of the optical signal back to the interrogator. The backscattered signal is processed in the Rx section to recover the acoustic signal or detect the vibration.

As previously noted, coherent DAS uses differential beating for every two selected locations along an optical fiber to detect fiber stress at location(s) in between the two selected locations. Coherent optical detection has X and Y polarization diversities, which changes randomly due to fiber movement or other factors. For this reason, the beating may use X-X, X-Y, Y-X, and Y-Y to fully utilize all the power, which results in 4 polarization diversities $\zeta_{xx}$, $\zeta_{xy}$, $\zeta_{yx}$, and $\zeta_{yy}$. Subsequent processing is required to combine the 4 diversity terms into a single term.

In a particular embodiment, the coherent receiver may employ multiple LO frequencies that are offset from interrogating frequencies by different amounts, to detect Rayleigh reflected signals. As part of this methodology, a Tx/Rx framing scheme may be employed which advantageously provide a frequency offset between the interrogation and coherent detection.

Operationally, DAS received signal samples are received in sequence of location-by-location within each frame, while the polarization diversity combining process requires a frame-by-frame processing for each location. The sequence conversion requires large amount of memory and bandwidth. Doubling the diversity terms from beating process further doubles the memory and bandwidth needed.

Systems, methods, and structures according to aspects of the present disclosure generally operate within or in conjunction with the receiver, and advantageously reduces the memory and bandwidth required by reducing beating diversity terms.

According to aspects of the present disclosure, X and Y polarizations are merged before beating, since polarization switching is a slow process as compared to location sampling rate (i.e., DAS pulse or frame repetition rate). Operationally, the two polarizations are first aligned to the same direction before merging, by rotating one of the polarizations (X or Y) to the other (Y or X), then rotated to maintain phase continuity.

The two polarizations first align to the one having higher averaged power (say pol-P). The X-Y combined signal is then passed to the beating module for differential beating, followed by phase extraction or other additional processing.

Advantageously, systems, methods, and structures according to aspects of the present disclosure may combine the two polarizations into one output before beating, such that there is only a single input to a beating module and only one output from beating. This overall inventive operation advantageously reduces the processing complexity and memory size.

Figure 1C:
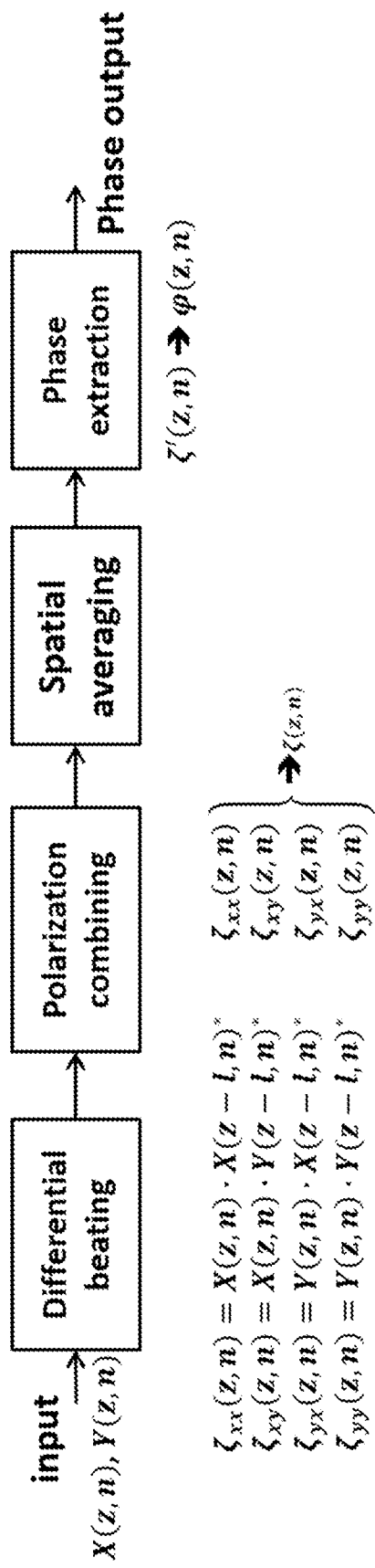
FIG. 1(C) is a schematic diagram showing illustrative processing of a coherent DAS arrangement according to aspects of the present disclosure.

As noted, systems, methods, and structures according to aspects of the present disclosure are for coherent DAS, which uses differential phase to detect the stress along the fiber, as illustrated in FIG. 1(C). Signal input X(z, n) and Y(z, n) are from the two polarizations X/Y; z is the location along the fiber, and n is the time sequence for that location. Differential beating generates four polarization diversities: $\zeta_{xx}$, $\zeta_{xy}$, $\zeta_{yx}$, and $\zeta_{yy}$. Polarization combining aligns the phase of the 4 polarizations and add together to have one output $\zeta(z, n)$. The present invention is generally directed to the function(s) located in between polarization combining and phase extraction modules.

Figure 2:
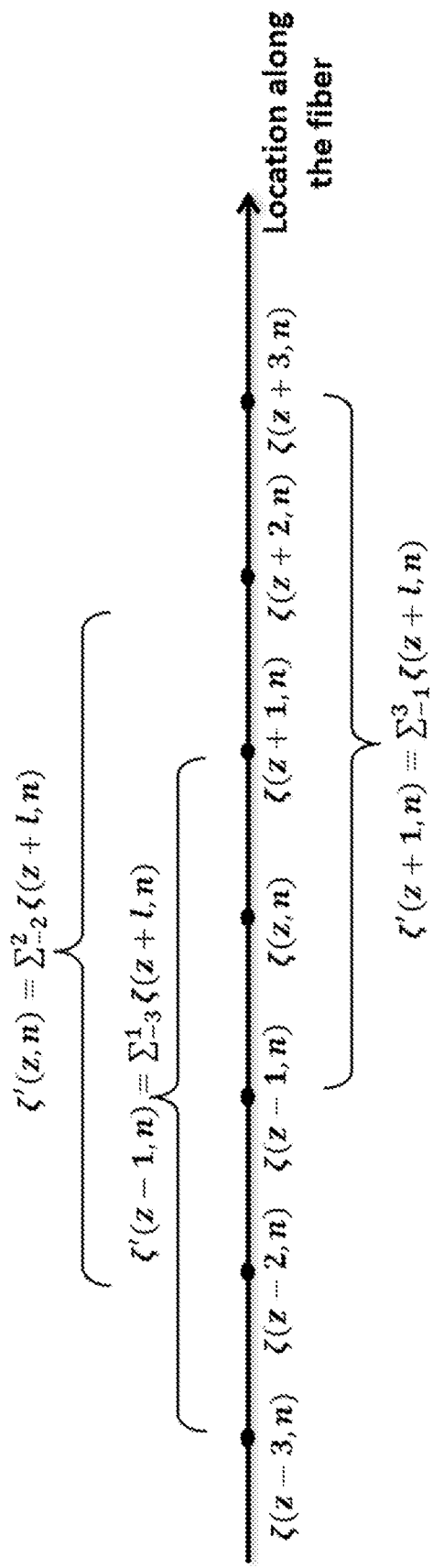
FIG. 2 illustrates spatial averaging according to aspects of the present disclosure.

Note that aspects of the present invention can be treated as a moving average function in spatial domain, which may be represented by:

$$\zeta'(z,n) = \sum_{l=-N_1}^{N_2} \zeta(z+l,n),$$

as illustrated in FIG. 2 for time n using example of 5-tap averaging.

FIG. 2 illustrates spatial averaging according to aspects of the present disclosure.

Figure 3:
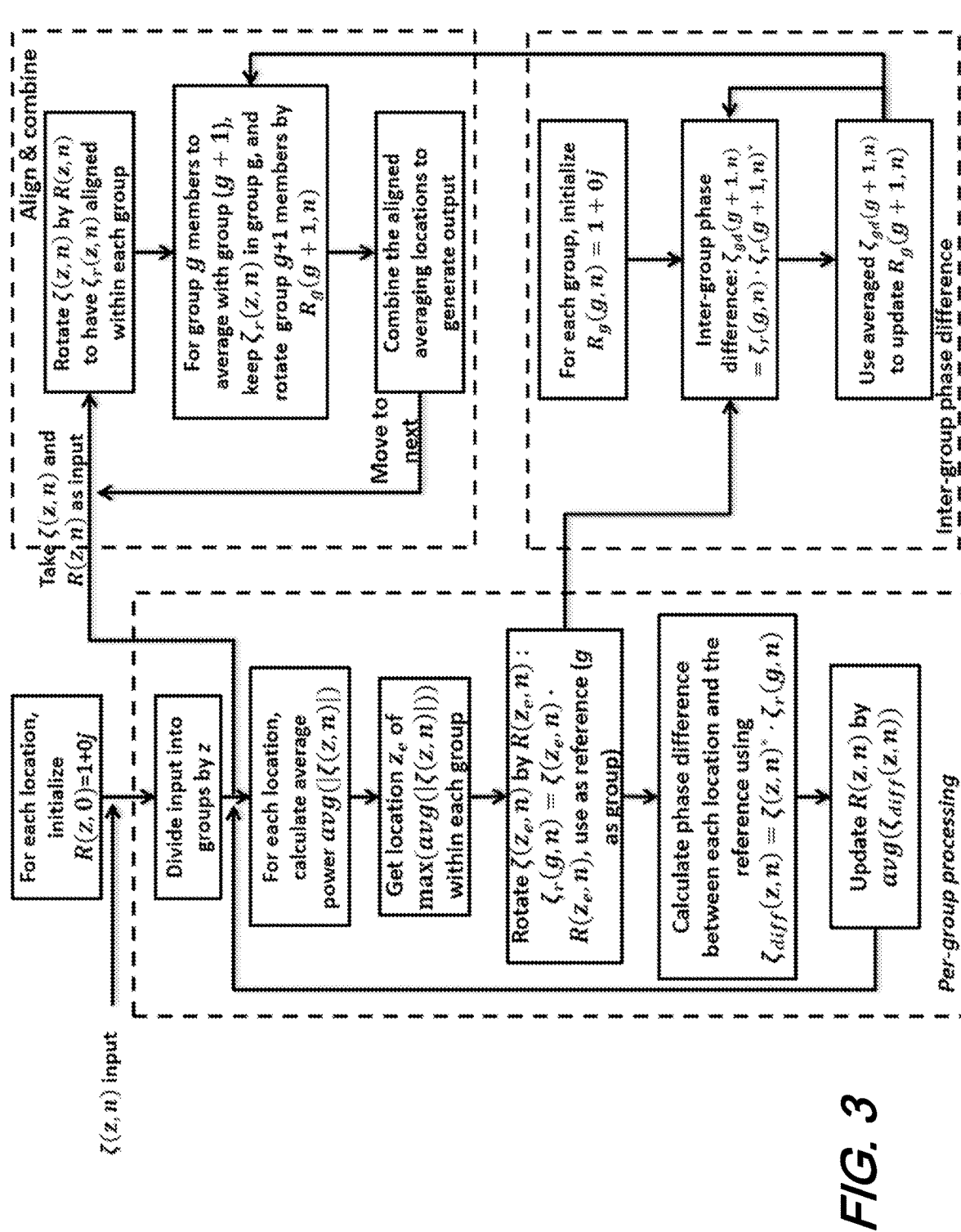
FIG. 3 is a flow diagram illustrating group's internal phase difference and rotating angle calculation according to aspects of the present disclosure broken down into per-group processing, inter-group phase difference processing, and align and combine processing operations.

As we have noted and now describe further, systems, methods and structures according to aspects of the present disclosure divide the locations along the fiber into non-overlapping groups. Each location has a phase rotation $R(z, n)$, which is used to align with the other locations inside its group. In each group, the location of the highest averaged power (or amplitude) is used as the "elected location", denoted as location $z_e$. The signal of the elected location $\zeta(z_e, n)$ is first rotated to have $\zeta_r(g, n) = \zeta(z_e, n) \cdot R(z_e, n)$, which is used as reference for this group. Then the input signal of each other location within the group calculates the phase difference with this reference by $\zeta(z, n)^* \cdot \zeta_r(g, n)$, where $\zeta(z, n)^*$ is the conjugate of the input signal $\zeta(z, n)$. This difference is used to update $R(z, n)$ using a low pass filter. This procedure is shown in FIG. 3 which is a flow diagram illustrating group's internal phase difference and rotating angle calculation according to aspects of the present disclosure broken down into per-group processing, inter-group phase difference processing, and align and combine processing operations.

Between every two neighbor groups, there is an inter-group phase rotation $R_9(g+1, n)$ (variable g for "group") used to align the phase of group (g+1) with group g. This signal is the average of the phase difference between group (g+1) and g, which is $\text{avg}(\zeta_r(g, n) \cdot \zeta_r(g+1, n)^*)$. The calculation of $R_9(g+1, n)$ is shown in FIG. 3 in the inter-group phase difference section.

For final combining, each location first performs group internal alignment, by rotating $R(z, n)$ to have $\zeta_r(z, n)$. For averaging that involves group g only, take $\text{sum}(\zeta_r(z, n))$ that $z \in$ group g. For those involving both group g and group (g+1), take the group rotation of $R_g(g+1, n)$ for locations in group (g+1) and then combine. This is shown in FIG. 3 in the align and combine section.

As described previously, aspects of the present disclosure provides for moving average using polarization combining output, to reduce the possibility of Rayleigh fading before sending to phase calculation, which is expected to improve the output signal's quality. Polarization combining may have each location pointing at different location, which makes it not possible to directly combine. The present disclosure provides a method to align the multiple locations that participate in an averaging.

Figure 4:
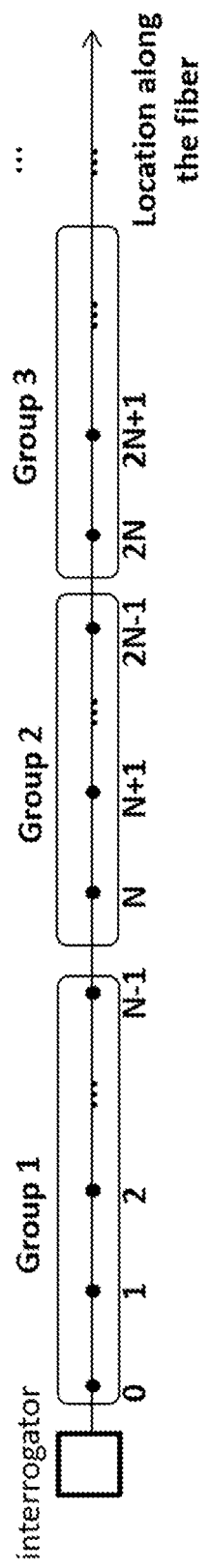
FIG. 4 is a schematic diagram illustrating locations grouping according to aspects of the present disclosure.

The present disclosure describes operations that divides the input signals into groups with N locations in each group, where N is the averaging taps, as shown in FIG. 4, which is a schematic diagram illustrating locations grouping according to aspects of the present disclosure. For example, for 5 taps of averaging, locations 0 to 4 belong to group 0, locations 5 to 9 belong to group 1, and so on.

Figure 5B:
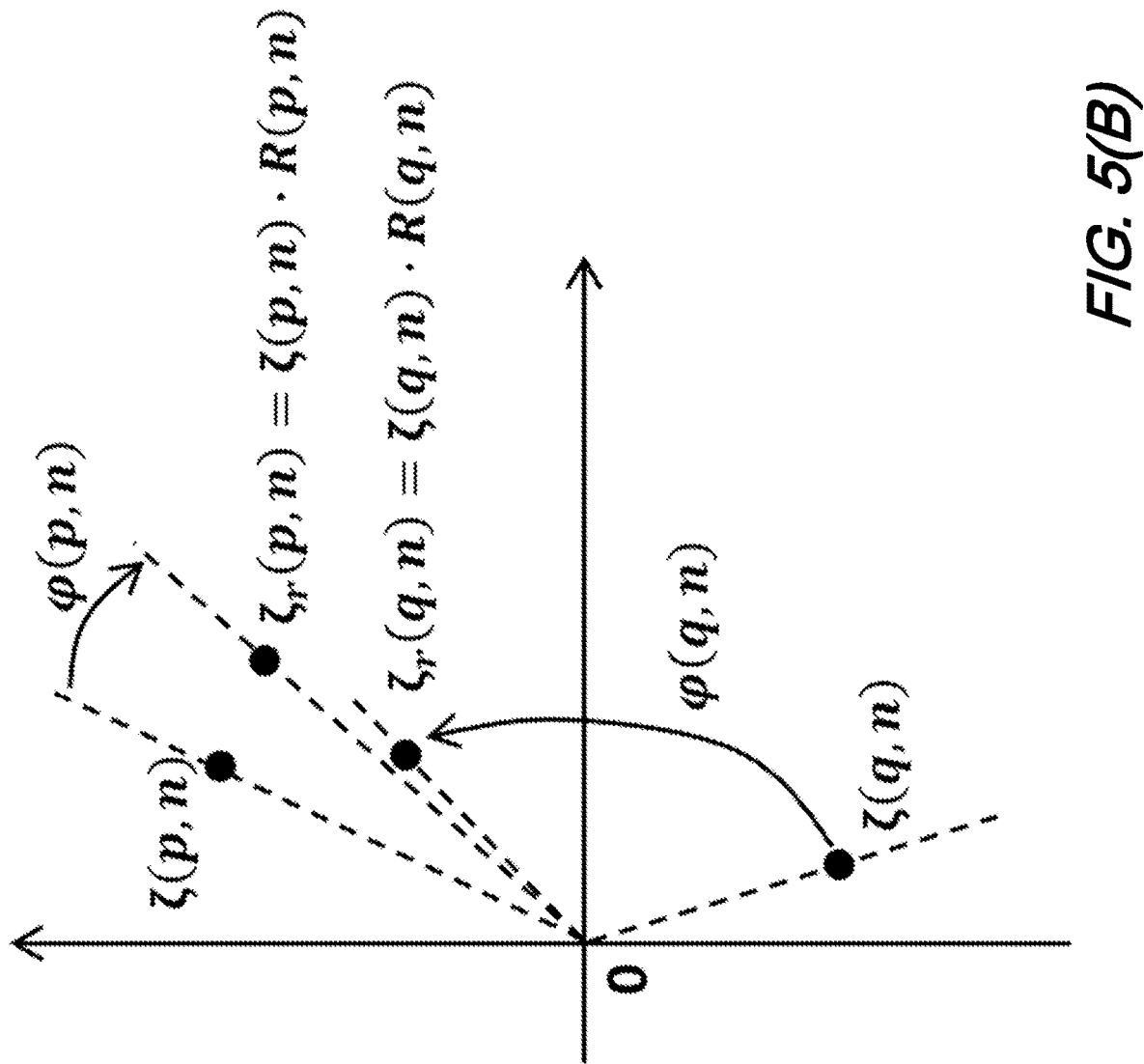

Each location has a rotation $R(z, n)$, for the signal to shift from its pointing direction (considered as DC) to align with other members within the group. FIG. 5(A) and FIG. 5(B) are a pair of plots illustrating group internal alignment according to aspects of the present disclosure.

For example, in FIG. 5(A), location p and q both belongs to group g, but with different DC directions as illustrated by input signals $\zeta(p, n)$, $\zeta(q, n)$, and the averaged signal $\overline{\zeta(p,n)}$ and $\overline{\zeta(q,n)}$. By applying rotation of $R(p, n)$ and $R(q, n)$ respectively, the two signals $\zeta_r(p, n) = \zeta(p, n) \cdot R(p, n)$ and $\zeta_r(q, n) = \zeta(q, n) \cdot R(q, n)$ will be aligned as shown in FIG. 5(B). In one embodiment, $\zeta(z, n)$ is rotated by normalized $R(z, n)$, which is $\zeta_r(z, n) = \zeta(z, n) \cdot (R(z, n)/|R(z, n)|)$.

Each group chooses the location of the maximum averaged power as the elected location $z_e$. The direction of the rotated signal $\zeta_r(z_e, n)$ is considered as the group's reference direction. Each other locations in the group compares with this reference direction to update its $R(z, n)$. The instant difference is calculated using $\zeta_{diff}(z, n) = \zeta_r(z_e, n) \cdot \zeta(q, n)^*$ as schematically shown in FIG. 6(A).

Figure 6A:
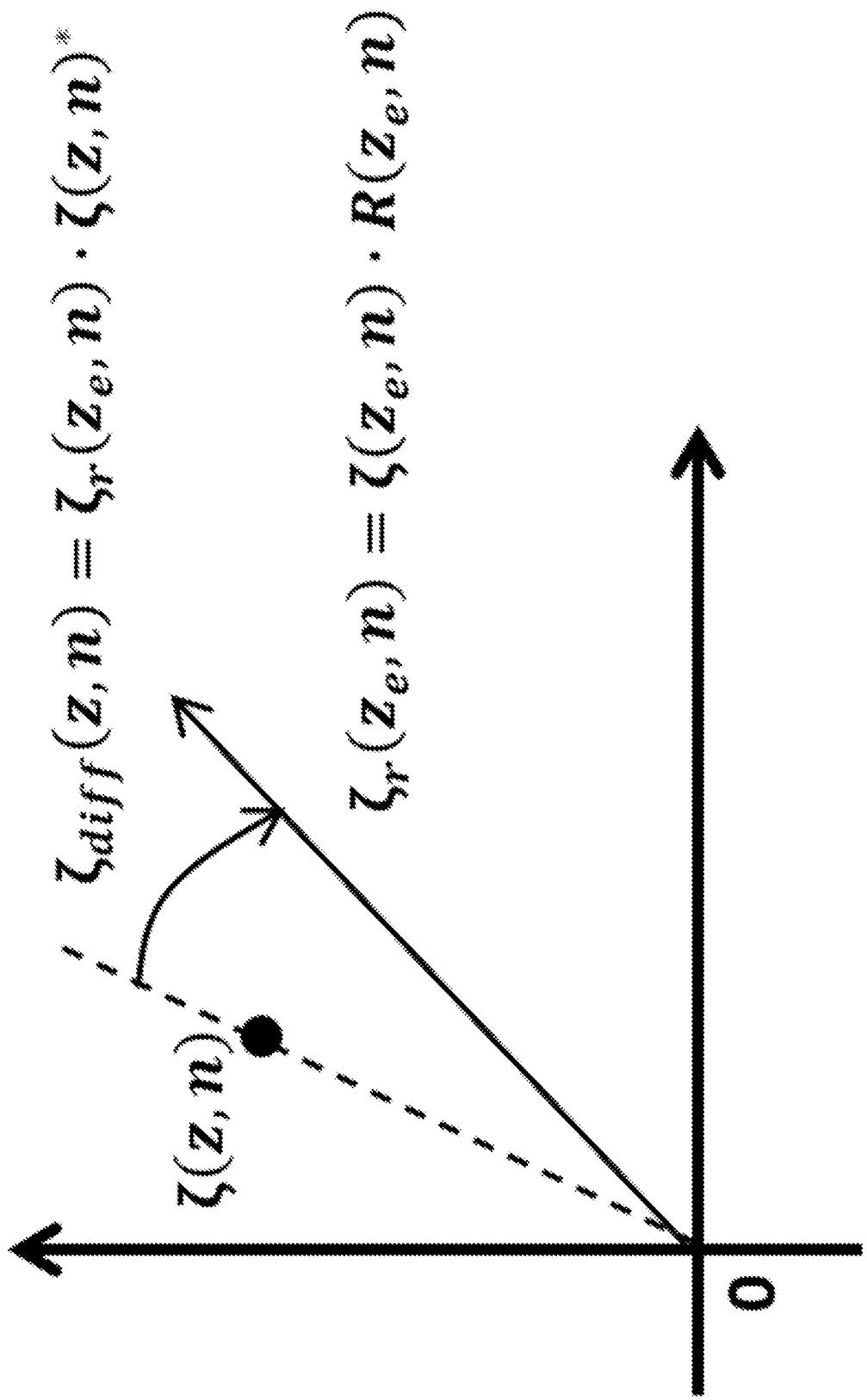
FIG. 6(A) and FIG. 6(B) show group internal phase difference calculation and rotation value update according to aspects of the present disclosure.
Figure 6B:
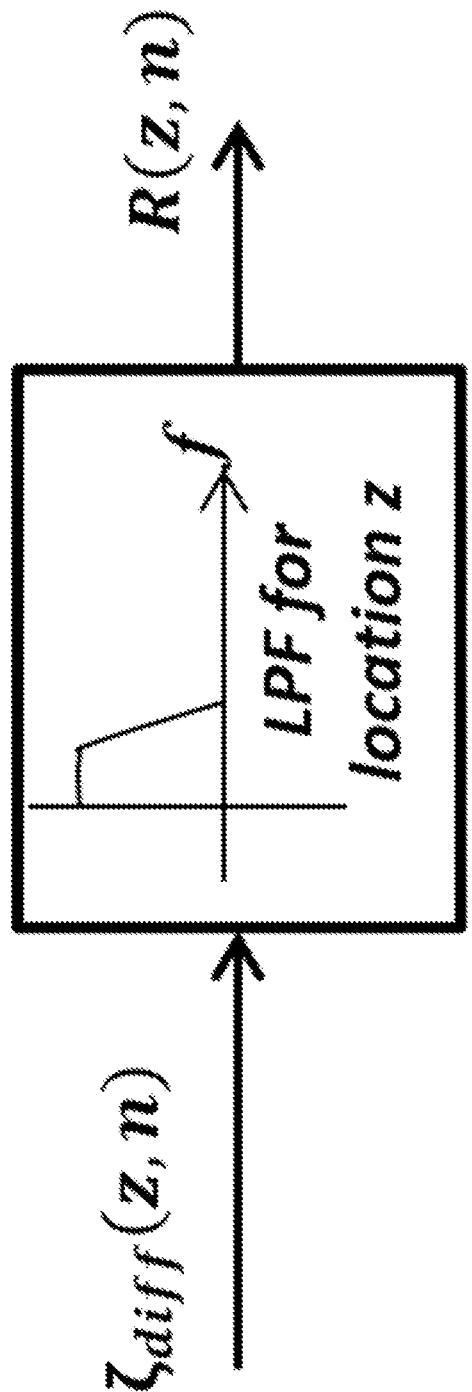

FIG. 6(A) and FIG. 6(B) show group internal phase difference calculation and rotation value update according to aspects of the present disclosure. With reference to this figure, we note that $R(z, n)$ is updated by $\text{avg}_n(\zeta_{diff}(z, n))$, using a low pass filter (FIG. 6(B)).

In one embodiment, $R(z, n)$ is updated by averaging (or low-pass filtering) the normalized $\zeta_{diff}(z, n)$, which is $\text{avg}_n(\zeta_{diff}(z, n)/|\zeta_{diff}(z, n)|)$.

Figure 7:
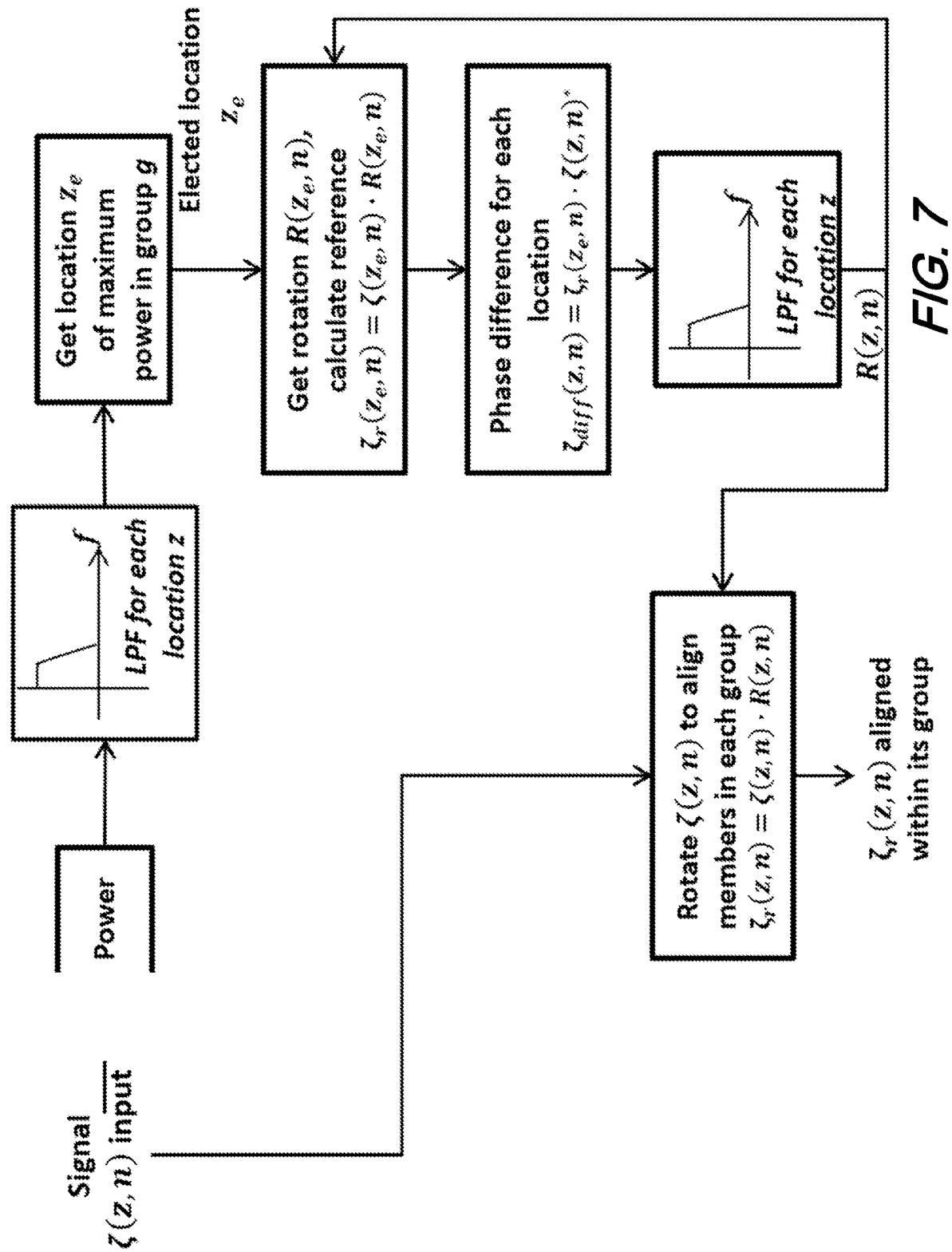
FIG. 7 is a flow diagram showing group internal rotation and alignment according to aspects of the present disclosure.

FIG. 7 is a flow diagram showing group internal rotation and alignment according to aspects of the present disclosure and summarizes the above procedure.

Figure 8:
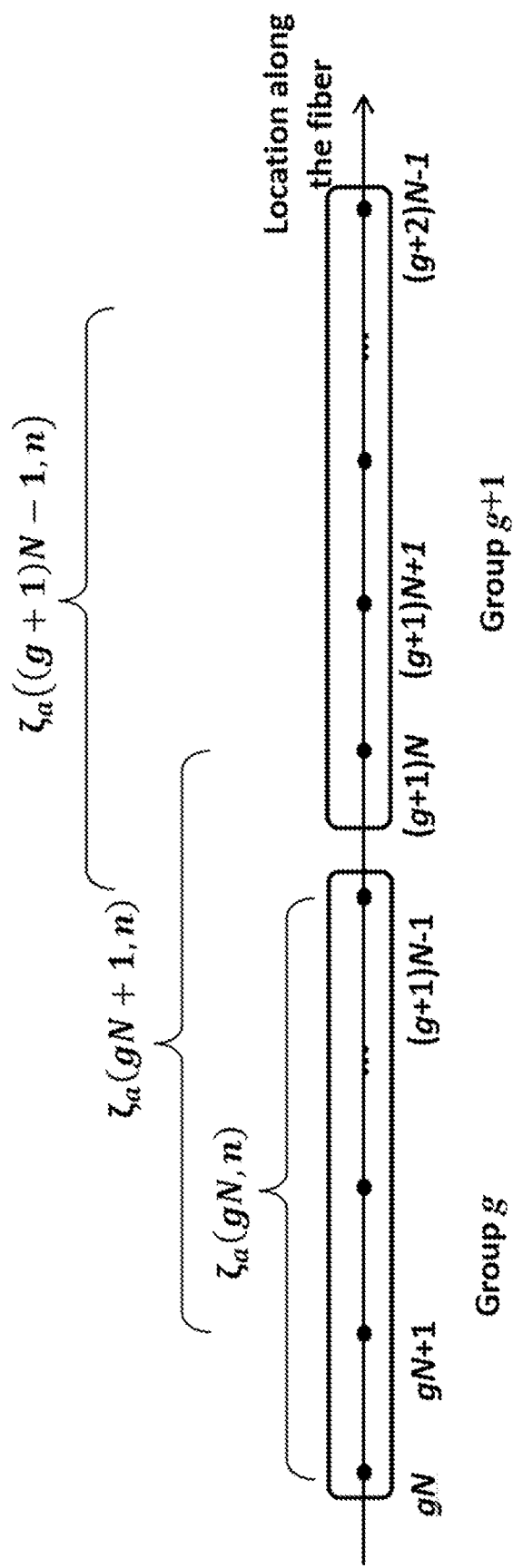
FIG. 8 is a schematic diagram showing inter-group alignment and groups that need further alignment according to aspects of the present disclosure.
Figure 9:
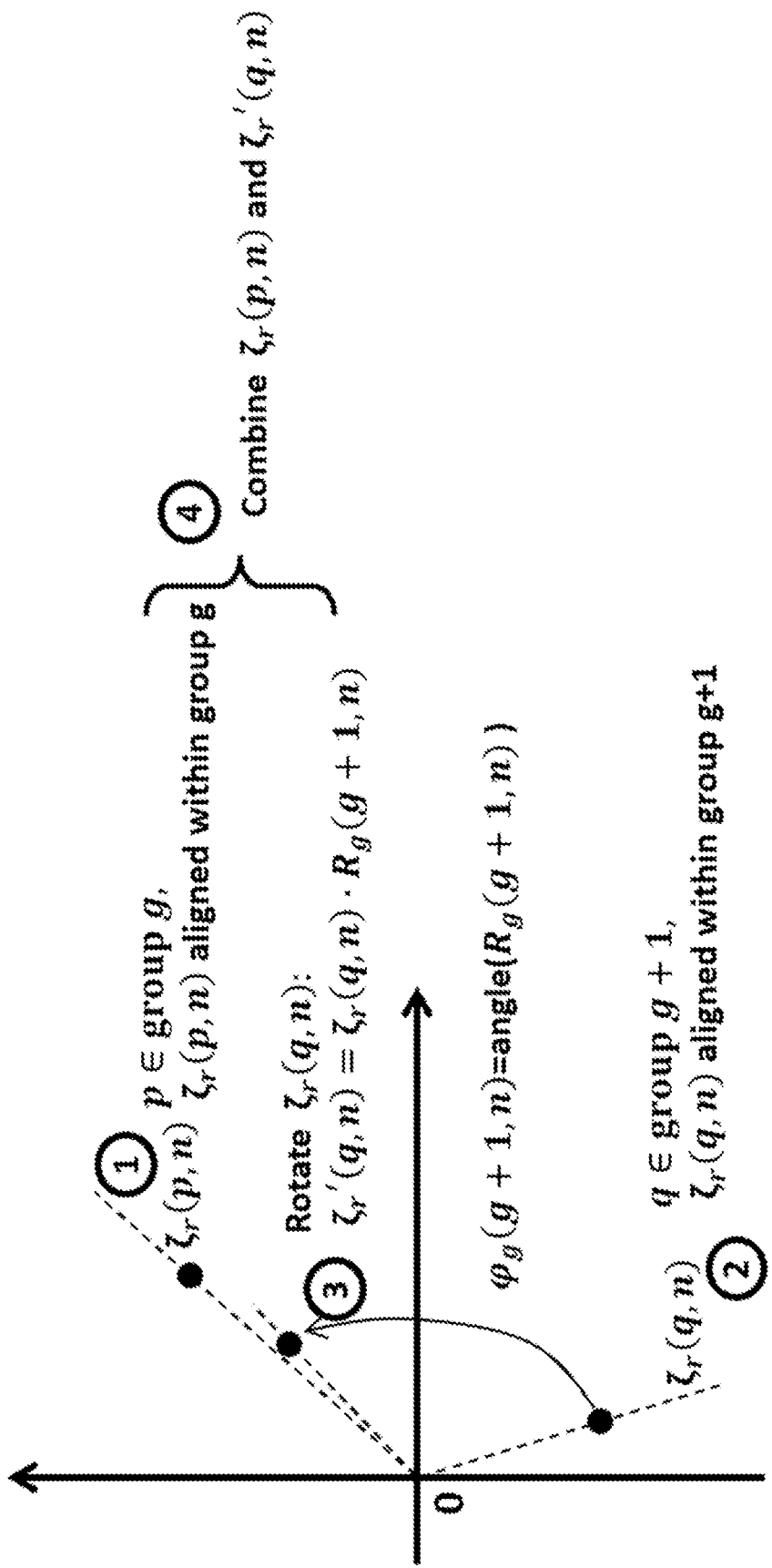
FIG. 9 is a schematic diagram showing inter-group alignment according to aspects of the present disclosure.

Once each group is internally aligned, the next step is inter-group alignment, for the combining of locations spanning two groups. As the example shown in FIG. 8—which is a schematic diagram showing inter-group alignment and groups that need further alignment according to aspects of the present disclosure—an averaged result $\zeta_a(gN, n)$ is from all locations within group g, which are already aligned using the procedure in FIG. 7, while results $\zeta_a(gN+1, n)$ to $\zeta_a((g+1)N-1, n)$ are from locations spanning both group g and group g+1 that need further alignment Each group (g+1) maintains the averaged phase difference $R_g(g+1, n)$ with its previous one (group g). Inter-group alignment is by rotating all the aligned signals within group (g+1) to the direction of signals in group g using $\zeta_r(z, n) \cdot R_g(g+1, n)$ where $z \in$ group g. The multi-location combining will be $\sum_{z=gN+i}^{(g+1)N-1} \zeta_r(z, n) + \sum_{z=(g+1)N}^{(g+1)N+i-1} \zeta_r(z, n) \cdot R_g(g+1, n)$. This operation is illustrated in FIG. 9.

Same as group internal alignment, the rotation in group (g+1) can be with normalized value which is $\zeta_r(z, n) \cdot (R_g(g+1, n)/|R_g(g+1, n)|)$. In one embodiment, the multi-location combining can apply a weight to each location, based on its averaged power.

The group rotation $R_g(g+1, n)$ is updated by the averaged difference between group g and (g+1), using the rotated signal of the elected locations in each group, which is $\text{avg}(\zeta_r(p_e, n) \cdot \zeta_r(q_e, n)^*)$, where $p_e \in$ group g, and $q_e \in$ group g+1. In one embodiment, $R_g(g+1, n)$ is generated from the normalized phase difference, $\zeta_r(p_e, n) \cdot \zeta_r(q_e, n)^*/|\zeta_r(p_e, n) \cdot \zeta_r(q_e, n)^*|$.

Figure 10:
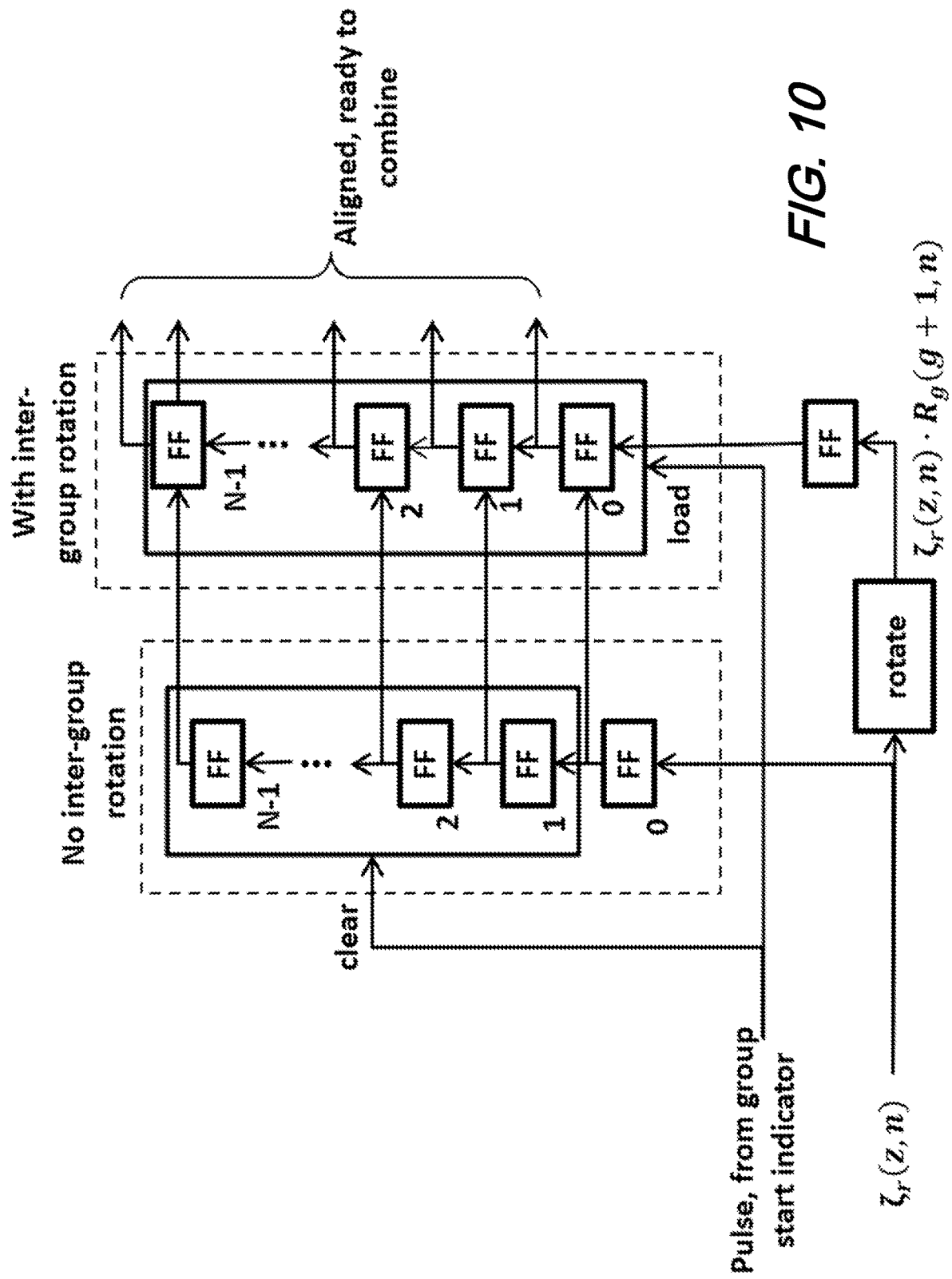
FIG. 10 is a schematic diagram showing intergroup alignment in implementation according to aspects of the present disclosure.

Giving location-by-location signal input, the inter-group alignment can be achieved by two parallel shift registers as shown in FIG. 10. With reference to that figure, we note that as used therein "FF" refers to "flip-flop" or register. The left-side shift registers have signals without inter-group rotation, while the right-side registers are rotated by inter-group phase difference. A pulse is generated once per group, used by the left side registers as "clear" signal, to clear registers 1~(N−1) to zero; used by the right side signals as "load" signals, to load the value from the left side registers to the right side registers. When the pulse is inactive, for each cycle a register loads the value from its previous register). By this operation, the registers of the right-side output always have the signals well aligned At this point, while we have presented this disclosure using some specific examples, those skilled in the art will recognize that our teachings are not so limited. Accordingly, this disclosure should be only limited by the scope of the claims attached hereto.

The invention claimed is:

1. A spatial averaging method for a coherent distributed acoustic sensing (DAS) system comprising:
   generating by an interrogator, interrogating light and sending it into a length of optical sensing fiber;
   detecting by a coherent detector, backscattered light that results from the interrogating light sent into the optical sensing fiber;
   generating and outputting by a coherent detector, signals indicative of detected backscattered light; and
   analyzing by a signal processor, the outputted signals indicative of detected backscattered light and determining strain signals associated with locations along the length of the optical sensing fiber that are indicative of a vibration and acoustic environment of the optical sensing fiber at the locations;
   SAID METHOD CHARACTERIZED IN THAT:
   differential beating and polarization combining of outputted signals for two locations along the length of the optical sensing fiber is used to determine a phase change in-between every location along the length of the optical sensing fiber; and
   a moving average is applied to the differential beaten, polarization combined, outputted signals from multiple locations in the spatial domain.

2. The method of claim 1 FURTHER CHARACTERIZED IN THAT:
   signals from individual locations are grouped into averaging groups and signals in one of the groups are aligned to a same direction;
   locations with a group are first aligned to an elected location; and
   locations spanning multiple groups employ a second alignment operation.

3. The method of claim 1 FURTHER CHARACTERIZED IN THAT:
   the spatial domain moving average is applied following polarization combining and diversity combining including frequency or wavelength diversity.

4. The method of claim 2 FURTHER CHARACTERIZED IN THAT: an elected location is one having a maximum short-term averaged power within its group.

5. The method of claim 4 FURTHER CHARACTERIZED IN THAT: each location has a phase rotation for a phase alignment inside its group.

6. The method of claim 5 FURTHER CHARACTERIZED IN THAT: a rotated signal of the elected location is used as a reference.

7. The method of claim 6 FURTHER CHARACTERIZED IN THAT: a group internal alignment procedure in which each location with a group is used to determine a phase difference between its input signal with the reference and phase rotation is updated by an averaged difference.

8. The method of claim 7 FURTHER CHARACTERIZED IN THAT: an inter-group alignment procedure in which every group maintains a group difference with its neighbor group such that group G+1 maintains the difference with group G or group G maintains the difference with group G+1 and the group difference is used to align averaging locations spanning the group and its neighbor groups.

9. The method of claim 2 wherein the groups exhibit a fixed size equal to spatial averaging taps.

* * * * *